US012780734B2

(12) United States Patent
Zajac et al.

(10) Patent No.: US 12,780,734 B2
(45) Date of Patent: Nov. 3, 2026

(54) TWO STEP CARBONATION HARDENING OF HYDRAULIC CEMENT BASED CONCRETE

(71) Applicant: HSustainability GmbH, Heidelberg (DE)

(72) Inventors: Maciej Zajac, Heidelberg (DE); Jan Skocek, Neckargemuend (DE); Mohsen Ben Haha, Heidelberg (DE)

(73) Assignee: HSustainability GmbH, Heidelberg (DE)

( * ) Notice: Subject to any disclaimer, the term of this patent is extended or adjusted under 35 U.S.C. 154(b) by 569 days.

(21) Appl. No.: 18/018,619

(22) PCT Filed: Jul. 28, 2021

(86) PCT No.: PCT/EP2021/071161
§ 371 (c)(1),
(2) Date: Jan. 30, 2023

(87) PCT Pub. No.: WO2022/033877
PCT Pub. Date: Feb. 17, 2022

(65) Prior Publication Data
US 2023/0357084 A1 Nov. 9, 2023

(30) Foreign Application Priority Data
Aug. 14, 2020 (EP) .................................... 20191143

(51) Int. Cl.
*C04B 28/06* (2006.01)
*C04B 7/36* (2006.01)
(Continued)

(52) U.S. Cl.
CPC ............ *C04B 28/065* (2013.01); *C04B 7/367* (2013.01); *C04B 28/188* (2013.01); *C04B 40/0236* (2013.01); *C04B 2111/00017* (2013.01)

(58) Field of Classification Search
CPC ..... C04B 28/065; C04B 7/367; C04B 28/188; C04B 40/0236; C04B 2111/00017; C04B 28/10; C04B 28/04; Y02P 40/18
See application file for complete search history.

(56) References Cited

U.S. PATENT DOCUMENTS 3,238,279 A * 3/1966 Tarlton .................. C04B 40/024 264/333
5,935,317 A * 8/1999 Soroushian ......... C04B 40/0231 106/819
(Continued)

FOREIGN PATENT DOCUMENTS

WO WO-2018232507 A1 * 12/2018 ............. B28C 5/003

OTHER PUBLICATIONS

International Search Report in PCT/EP2021/071161, mailed Oct. 28, 2021.
(Continued)

*Primary Examiner* — Anthony J Green
*Assistant Examiner* — Sarah Catherine Case
(74) *Attorney, Agent, or Firm* — Collard & Roe, P.C.

(57) ABSTRACT

A method for manufacturing concrete parts has the steps of: providing a hydraulic cement and aggregate; mixing the cement and aggregate with water to provide a fresh concrete; introducing $CO_2$ into the fresh concrete in an amount resulting in a carbonation degree of more than 0.5 wt.-% and less than 5 wt.-% of the total carbonatable Ca and Mg phases for a first carbonation step; curing the fresh concrete until at least 15 wt.-% of the calcium aluminates are hydrated to provide a green concrete part; subjecting the green concrete part to $CO_2$ in an amount resulting in a carbonation degree of more than 10 wt.-% of the total carbonatable Ca and Mg phases for a final carbonation step; and storing the part for 0.5 hours to 28 days for further hydration of not-yet carbonated, not-yet hydrated cement to provide the concrete part; and concrete parts obtainable with the method.

19 Claims, 3 Drawing Sheets

(51) Int. Cl.

| | |
|---|---|
| ***C04B 28/18*** | (2006.01) |
| ***C04B 40/02*** | (2006.01) |
| *C04B 111/00* | (2006.01) |

(56) References Cited

U.S. PATENT DOCUMENTS

| | | | |
|---|---|---|---|
| 2012/0082839 | A1 | 4/2012 | Ha et al. |
| 2014/0197563 | A1 | 7/2014 | Niven et al. |
| 2016/0280598 | A1 | 9/2016 | Wang et al. |
| 2019/0077045 | A1 | 3/2019 | Monkman et al. |
| 2020/0165170 | A1 | 5/2020 | Niven et al. |

OTHER PUBLICATIONS

Written Opinion of the International Searching Authority in PCT/EP2021/071161, mailed Oct. 28, 2021.

International Preliminary Report on Patentability in PCT/EP2021/071161, dated Dec. 1, 2022.

Maciej Zajac et al: "CO2 mineralisation of Portland cement: Towards understanding the mechanisms of enforced carbonation", Journal of CO2 Utilization, vol. 38, May 1, 2020 (May 1, 2020), pp. 398-415.

European Search Report dated Jan. 29, 2021 in European Application No. 20191143.5.

Office Action issued in Canadian Application No. 3,188,393, Dated May 13, 2026.

* cited by examiner

TWO STEP CARBONATION HARDENING OF HYDRAULIC CEMENT BASED CONCRETE

CROSS REFERENCE TO RELATED APPLICATIONS

This application is the National Stage of PCT/EP2021/071161 filed on Jan. 28, 2021, which claims priority under 35 U.S.C. § 119 of European Application No. 20191143.5 filed on Aug. 14, 2020, the disclosure of which is incorporated by reference. The international application under PCT article 21(2) was published in English.

The present invention relates to a method of manufacturing concrete parts and the concrete parts obtainable thereby.

The cement industry is struggling with high $CO_2$ emissions related to the production of cement clinker. A major part of the $CO_2$ emissions related to the clinker production originates from the raw materials used, i.e. from limestone. As environmentally friendlier alternatives to limestone do not exist at large enough scale, reduction of the raw material emissions by limestone substitution is not possible.

Reduction of cement and concrete industry environmental footprint by utilization of industrial by-products as supplementary cementitious materials (SCM) for clinker replacement has reached global availability limits of these materials. Furthermore, the availability of the two most important SCM—fly ashes and blast furnace slags—is expected to decrease with the progressing decarbonation of the electricity sector and increased steel recycling, respectively. As a result, limestone and potentially clays, that need to be calcined, are the only SCMs available in sufficient amounts to meet the increasing cement demands. However, the production of the calcined clay, i.e. grinding, drying, calcination, is related to the significant $CO_2$ emissions as well.

The $CO_2$ emissions may be limited by a further optimization of the cement clinker production. However, such development is limited because of the technological barriers.

The only large-scale $CO_2$ abatement measure is then the post-production carbon capture and storage (CCS) or utilization (CCU). Carbon capture technologies such as amine-based $CO_2$ scrubber, membrane-based gas separation, oxyfuel kiln lines or indirect calcination of the calcium carbonate are needed for the CCS to work efficiently. The storage of $CO_2$ has several social and technical constrains, still being the most promising short term solution for the cement industry. Nonetheless, a pursuit of alternative solutions is ongoing and particular focus is on CCU solutions. The $CO_2$ captured from the cement industry can be used for the food industry or during the oil recovery. However, the volume of the $CO_2$ gases currently used for both application is significantly lower compared to the volume of the $CO_2$ emitted during the cement production. Consequently alternative solutions are needed.

Several suggestions to bind $CO_2$ in concrete are also known. For example, US 2014/0197563 A1 and US 2019/0077045 A1 propose to introduce $CO_2$ in freshly made concrete paste to react with $Ca(OH)_2$ formed during cement hydration. Thereby, $CO_2$ is sequestered and properties of the concrete like strength development are said to be improved. The mechanism of carbonation has recently been studied, see M. Zajac et al., "$CO_2$ mineralization of Portland cement: towards understanding the mechanisms of enforced carbonation", J. $CO_2$ Utilization 38 (2020) 398-415. These proposals provide progress but the capacity for $CO_2$ sequestration is limited and procedural problems are not really solved. Thus, there is an ongoing need for improved methods and products.

Surprisingly it has now been found that a combination of minor carbonation of the fresh concrete paste, hydration to provide green and early strength and consume water, and carbonation hardening to provide final strength followed by hydration in post-curing provides an easy to apply and economic process without the need for complicated devices. The obtained concrete parts have the required properties comparable to parts from hydraulic hardening of ordinary Portland Cement (OPC) and allow using conventional steel reinforcement.

Thus, the above described object is solved by a method for manufacturing concrete parts comprising the steps:

- providing aggregate and a hydraulic cement containing calcium aluminate
- mixing the cement and aggregate with water to provide a fresh concrete
- introducing $CO_2$ into the fresh concrete in an amount resulting in a carbonation degree of more than 0.5 wt.-% and less than 5 wt.-% of the total carbonatable Ca and Mg phases which are calculated as $0.785\times(CaO-0.56\ CaCO_3-0.7\ SO_3)+1.091\times(MgO-0.479\ MgCO_3)$, wherein CaO, MgO and $SO_3$ are the contents of respective oxides in weight percent and $CaCO_3$ and $MgCO_3$ are the contents of the respective compounds in weight percent, for a first carbonation step
- curing the fresh concrete until at least 15 wt.-% of the calcium aluminates are hydrated to provide a green concrete part
- subjecting the green concrete part to $CO_2$ in an amount resulting in a carbonation degree of more than 10 wt.-% of the total carbonatable Ca and Mg phases which are calculated as $0.785\times(CaO-0.56\ CaCO_3-0.7\ SO_3)+1.091\times(MgO-0.479\ MgCO_3)$, wherein CaO, MgO and $SO_3$ are the contents of respective oxides in weight percent and $CaCO_3$ and $MgCO_3$ are the contents of the respective compounds in weight percent, for a final carbonation step, and
- storing the part for 0.5 hours to 28 days for further hydration of not-yet carbonated, not-yet hydrated cement to provide the concrete part. The object is also achieved by concrete parts obtainable by the method. The post-curing step can be realized during product storage, also outside of the production facility.

The method according to the invention differs from previous approaches by the simplified process and equipment utilized. Neither concentrated carbon dioxide nor specific molds or curing chambers are needed. The obtained concrete parts differ from known concrete parts in that they have calcite very evenly distributed throughout the part. Without wishing to be bound by this theory it is currently believed that introduction of a small amount of $CO_2$ into the fresh concrete provides a high number of very small calcite crystals from reaction of already liberated $Ca(OH)_2$ with the $CO_2$ which in turn are able to promote efficient full carbonation after the first hydration step. During first hydration further $Ca(OH)_2$ as well as C—S—H is developed while cement phases which are slow to carbonate like calcium aluminates, $C_4AF$ and ferrites are reacted into strength providing hydrates in the known manner. Further, consumption of water allows pores to form that ease access of $CO_2$ into the green part for final carbonation. The process is completed with a storage period allowing post-curing via hydration of the cement components that can still be hydrated by reaction with the water accompanied by carbonation of carbonatable phases by reaction with carbon dioxide still present.

So as to simplify the description the following abbreviations that are usual in the field of cement are used herein: H—$H_2O$, C—CaO, A—$Al_2O_3$, F—$Fe_2O_3$, M—MgO, S—$SiO_2$ and $—$SO_3$. Compounds are mostly named by the pure form, without explicit mentioning of solid solutions, foreign ion substitution and impurities etc. as are usual in technical and industrial materials. As the man skilled in the art knows, the exact composition of the phases described may vary due to substitution with foreign ions. Such compounds are comprised when mentioning the pure form herein unless it is expressly stated otherwise.

The term "reactive" shall mean a hydraulic reactivity unless specified otherwise. Hydraulic reactivity designates the reaction of a compound with water or other water containing compounds to form hydrated phases including a reaction of two or more compounds occurring simultaneously.

Herein, clinker designates a sinter product obtained by burning a raw material at elevated temperature and containing at least one hydraulic phase. Burning means a change of one or more property of the starting material such as chemistry, crystallinity, phase composition, spatial arrangement and bonds of lattice atoms which is brought about by a supply of thermal energy. The starting material may be a single material, but usually it is a mixture. The starting material is typically finely ground and then designated as raw meal. The starting material may contain mineralizers, which are substances decreasing the temperature necessary for melting and/or act as fluxes and/or enhance clinker formation e.g. by forming solid solutions or stabilisation of phases. Mineralizers can be part of the starting material components or be added as separate component.

Cement is used to designate a material that, after mixing with a liquid to form a paste, is able to develop mechanical strength by hydraulic reaction. Thus, cement denotes a clinker ground with or without further components, and other mixtures like super sulphated cement, geopolymer binder, and dicalcium silicate cement obtained by hydrothermal treatment. Binder or binder mixture means a material or mixture containing cement and developing mechanical strength by a hydraulic reaction with water or otherwise like by carbonation, wherein the binder typically but not necessarily contains more components than the cement. A binder is used adding water or another liquid and mostly also aggregate as well as optionally admixtures and/or additives.

A mixture of cement or binder with water which has not, yet, gained appreciable strength is designated cement paste. A mixture from cement, aggregate and water is designated fresh concrete. Usually it is differentiated between mortar from sand as aggregate and concrete having sand and gravel as aggregate as well as special products like screed. In contrast, fresh concrete shall here cover all mixtures containing cement, aggregate and water that have not gained green strength, independent of aggregate sizes and other mixture aspects.

Starting with first water contact the cement components begin to hydrate, wherein for a typical Portland cement an induction period starts after the first few minutes. Setting and perceivable hardening typically begin after 1 to 3 hours. Typically, it takes some hours until appreciable strength is gained and the fresh concrete becomes a green concrete part that can be handled (unless it is too big for handling like a wall). Herein, due to the additional carbonation, the green strength can be due to carbonates as well as to hydrates. Hardening needed to provide the ready for use concrete part takes usually at least 1 day, often 2 to 7 days, while final maximum strength is often only reached after 28 days or even more. Herein, green concrete part means a part that has enough integrity to be handled and concrete part means a part that has hardened enough to be used, even if strength continues to increase as long as water or carbon dioxide allow reaction of not-yet hydrated and/or not-yet carbonated components.

A supplementary cementitious material (SCM) is defined as a pozzolanic and/or latent hydraulic material useful to replace a part of the clinker in a binder. Latent hydraulic materials have a composition that allows hydraulic reaction upon contact with water, wherein typically an activator is needed to enable hardening within technically feasible times. Activator means a substance that accelerates the hardening of latent hydraulic materials. It can be an addition like sulfate or calcium (hydr)oxide and/or products of the hydraulic reaction of the ground clinker, e.g. calcium silicates liberate calcium hydroxide during hardening. Pozzolanic materials are characterized by a content of reactive silica and/or alumina which form strength providing calcium silicate hydrates and calcium aluminate hydrates, respectively, during hydration of the clinker together with the calcium hydroxides liberated. In practice the limit between latent hydraulic and pozzolanic materials is not well defined, for example fly ashes can be both latent hydraulic and pozzolanic depending on their calcium oxide content. Consequently, the term SCM designates both latent hydraulic as well as pozzolanic materials. However, not reactive or only slightly reactive materials like limestone that substantially do not take part in the hydraulic reactivity have to be clearly differentiated from SCM, with which they are sometimes summarized as mineral additions.

In the present invention a two-step carbonation hardening of fresh concrete made out of hydraulic cements is applied in combination with hydration. Suitable cements are for example, but not limited to, Portland cements, Portland composite cements, calcium aluminate cements, calcium sulfo aluminate cements and dicalcium silicate cements. Preferred cements are such according to DIN EN 197, most preferably neat Portland cements (CEM I) and limestone containing Portland cements like CEM II/A/B-L/LL.

The cement is made into a fresh concrete by mixing at least with water and aggregate. Typically, a water:cement weight ratio (w/c) from 1 to 0.1, preferably from 0.7 to 0.15, and most preferred from 0.5 to 0.2 is used. In case the cement comprises one or more SCMs, those are included into the amount of cement for calculating the w/c. The fresh concrete also contains aggregate as well as optionally admixtures and/or additives.

Aggregate can be any aggregate known as such. Normally sand and/or gravel of selected particle sizes is/are used. In some embodiments lightweight aggregate is used, typically as part of the aggregate but also as sole aggregate. The aggregates can be partly or solely recycled aggregates.

As a rule, a fresh concrete also contains admixtures to optimize the properties of the mixture like setting time, hardening time, spread, viscosity and homogeneity as well as to impart desired properties to the final concrete part like strength, flexural modulus, freeze-thaw-resistance and many more. These admixtures are known per se and are used in their usual amounts. At least admixtures like water reducing agents, plasticizers and super plasticizers to adjust consistency while keeping the w/c in the range suitable for providing pores allowing carbonation, preferably self-desiccation, are typically contained. Useful water reducing agents, plasticizers and super plasticizers are for example, but not exclusively, organic compounds with one or more carboxylate, sulfonate, phosphonate, phosphate or alcohol functional group. Other admixtures that influence workability are retarders. They mainly aim at prolonging the time that a specified consistency is maintained. Retarders slow the setting and/or hardening of the binder paste. Suitable substances are for example, but not exclusively, phosphates, borates, salts of Pb, Zn, Cu, As, Sb, lignosulphonates, hydroxycarboxylic acid and their salts, phosphonates, and sugars (saccharides). Furthermore, it is possible to use admixtures that improve the concrete durability performance like air entraining or hydrophobic agents.

Special admixtures can be added in order to improve the dissolution of the carbonate ions in the interacting solutions and consequently to accelerate the carbonation process. These can be aqueous solvents like alkanolamines, e.g. primary amines like monoethanolamine (MEA) and diglycolamine (DGA), secondary amines like diethanolamine (DEA) and diisopropanolamine (DIPA), and tertiary amines like methyldiethanolamine (MDEA) and triethanolamine (TEA), or mixtures of two or more of them or other substances that can be used for improving $CO_2$ dissolution in the solution. Additionally, enzymes such as carbonic anhydrase (CA) can be used to enhance carbonation efficiency and modify the properties of the reaction products. It is to be noted that these admixtures have not only one action but can exercise a double role. They can modify the hydration process as well as modify the carbonation process. The effect can largely depend on the dosage Also it is possible to add admixtures that modify the morphology of the precipitating calcite during the hydration-carbonation process. This provides the advantage of building less dense shales of hydrates-carbonates product and enables higher carbonation and hydration degrees. Suitable are for example magnesium salts, poly(acrylic acids), polyacrylamide, poly(vinyl alcohol), polyvinyl sulfonic acids, styrene sulfonate, citric acid and other organic acids, polysaccharides and other substances, e.g. phosphonates, polycarboxylates.

Moreover it is possible to add admixtures that regulate the pH during the hydration-carbonation process in order to enhance the precipitation of the calcite, these include metal hydroxides and carbonates and similar substances.

Further, additives are often used in concrete like fillers, pigments, polymers, and fibers. Fillers are added to increase strength, including early strength, and raise particle packing density. Typical fillers are limestone and other stone dust, but other material of adequate fineness and durability is also useful. Also micro silica and fumed silica are useful, they are conventionally considered filler although they show a pozzolanic reaction. Pigments and colorants provide desired aesthetics and can also be added to a layer or the surface of a concrete part. Polymers and fibers increase flexural modulus and crack resistance. The amount of additives is very variable and depends on the specific additive. The known amounts are used.

For the first carbonation step carbon dioxide is introduced into the fresh concrete to provide a small amount of calcium carbonates, typically calcite, vaterite, aragonite or amorphous forms of calcium carbonate including the hydrated forms, evenly distributed in the mixture. Unpurified $CO_2$ gas can be used since a $CO_2$ concentration from 5 to 99 Vol.-% is useful. Furthermore, a hardening including the described process may be conducted at variable $CO_2$ concentrations. The $CO_2$ may be provided in the form of gas, solution or as solid material to the fresh concrete. Gases from modified clinker production lines, e.g. oxyfuel kiln lines or indirect calcination of the calcium or magnesium carbonate, or from carbon capture technologies applied or supposed to be applied in the cement industry, such as amine-based $CO_2$ scrubber, membrane-based gas separation, are preferably used to supply $CO_2$ in the method according to the invention.

The introduction of $CO_2$ into the fresh concrete can be accomplished by one or more of (i) mixing of fresh concrete in the presence of gaseous $CO_2$,
(ii) adding solid $CO_2$ to the fresh concrete during mixing
(iii) dissolving $CO_2$ in an aqueous component added to the fresh concrete,
(iv) pre-carbonating the dry cement before mixing at the suitable temperature, relative humidity and $CO_2$ concentration and/or
(v) soaking part or all aggregates with a $CO_2$-rich solution before adding it to the fresh concrete.

The important point is a presence of a small but substantially higher than atmospheric amount of carbon dioxide in the fresh concrete. Two or more of the variants can be combined. For example, both cement and aggregate can introduce carbon dioxide combining variant (iv) and (v). A carbon dioxide solution depleted in $CO_2$ by soaking the aggregate according to variant (v) can suitably be used as mixing water according to variant (iii). Gaseous carbon dioxide with a $CO_2$ concentration decreased by having been bubbled through the fresh concrete during mixing in variant (i) can be used for variant (iv). Thereby, $CO_2$ sequestration increases more or less without additional effort.

For variant (i) carbon dioxide is inserted as gas into the mixing device and/or into the fresh concrete during mixing. The gaseous $CO_2$ is suitably introduced into the fresh concrete with a tube, preferably with a gas distribution head like a sponge or nozzle. The $CO_2$ concentration in the gas suitably ranges from 1 to 100 Vol.-%, preferably from 5 to 95 Vol.-%, most preferred from 20 to 50 Vol.-%. Typically, carbon dioxide is added or allowed to react for 1 second to 100 minutes, preferably from 10 seconds to 50 minutes and most preferred from 15 seconds to 15 minutes. The temperature usually ranges from 0 to 80° C., ambient temperature is normally most preferred. Typically, from 0.1 to 10000 l/minute are injected per $m^3$ of mixture, preferably from 0.5 to 5000 l/minute, most preferred from 1 to 1000 l/minute, depending on the amount of cement in the fresh concrete.

A specifically efficient way of introduction is adding solid carbon dioxide during mixing, variant (ii). Usually, an amount from 0.1 to 30 kg $CO_2$ per t clinker, preferably from 0.5 to 20 kg $CO_2$/t clinker and most preferred from 0.5 to 10 kg $CO_2$/t clinker will be used. Typically, carbon dioxide is added or allowed to react for 1 second to 100 minutes, preferably from 10 seconds to 50 minutes and most preferred from 15 seconds to 15 minutes. The temperature usually ranges from 0 to 80° C., ambient temperature is normally most preferred.

A very easy way to introduce $CO_2$ into the fresh concrete is dissolving the carbon dioxide in an aqueous component used anyway according to variant (iii). The aqueous component is preferably the mixing water or a part of it, but also an admixture or additive solution/suspension or more than one aqueous component. A solution can be obtained by bubbling the gaseous $CO_2$ through water, for example through the mixing water. The $CO_2$ concentration in the fresh concrete suitably ranges from 1 to 5000 mM, preferably from 5 to 2000 mM, most preferred from 10 to 1000 mM. The high carbon dioxide concentrations can be achieved by one or more of exposing the water or solution or fresh concrete to concentrated $CO_2$, high alkali concentration in the water/solution/fresh concrete, and/or high pressure. Typically, carbon dioxide is added or allowed to react for 1 second to 100 minutes, preferably from 10 seconds to 50 minutes and most preferred from 15 seconds to 15 minutes. The temperature usually ranges from 0 to 80° C., ambient temperature is normally most preferred.

It also suffices to store the dry cement under carbon dioxide, variant (iv), wherein the concentration of $CO_2$ and time, relative humidity etc. are adjusted to achieve the desired carbonation. Here the $CO_2$ concentration in the gas suitably ranges from 1 to 100 Vol.-%, preferably from 3 to 95 Vol.-%, most preferred from 5 to 50 Vol.-%. Typically, carbon dioxide is added or allowed to react for 1 second to 100 minutes, preferably from 10 seconds to 50 minutes and most preferred from 15 seconds to 15 minutes. The temperature usually ranges from 0 to 80° C., ambient temperature is normally most preferred. Further, the relative humidity (RH) should range from 10 to 100%, preferably from 30 to 90%, and most preferred from 50 to 70%.

Last but not least it is possible to soak the aggregate with a $CO_2$ solution, variant (v), to introduce carbon dioxide into the fresh concrete. This is especially useful for porous aggregate. The $CO_2$ concentration in the solution for soaking suitably ranges from 1 to 5000 mM, preferably from 5 to 2000 mM, most preferred from 10 to 1000 mM. The temperature usually ranges from 0 to 80° C., ambient temperature is normally most preferred. It will depend on the porosity of the aggregates, the $CO_2$ concentration in the soaking solution and the desired carbon dioxide amount in the fresh concrete whether all or a part of the aggregate is soaked and for how long. The higher the porosity and/or the $CO_2$ concentration, the lower the fraction of the aggregate and/or the shorter the time that the aggregate is soaked. Typically, soaking is performed for 1 to 100 minutes.

During the first carbonation step less than 20 wt.-%, preferably less than 10 wt.-% and most preferred less than 5 wt.-% of the total consumed $CO_2$ is inserted into and reacted with the fresh concrete. The amount of carbon dioxide introduced into the fresh concrete is adjusted so that the carbonation degree is limited to 5%, preferably to 4% and most preferred to 3% of the total carbonation degree. A suitable lower limit of total carbonation degree is 0.5%, preferably 1%. The total carbonation degree is defined as the maximal amount of $CO_2$ that can be bound during the carbonation process. Carbonation is a chemical reaction in which carbon dioxide, $CO_2$, is bound to a substrate. In the field of cement and concrete, the inorganic substrate formed comprises salts of carbonic acid and alkali metals, alkali earth metals and iron. Other carbonates are possible, but their amounts are irrelevant for cement and concrete carbonation. Additionally, since alkali metal carbonates such as $Li_2CO_3$, $Na_2CO_3$ or $K_2CO_3$ are highly soluble in water, they are not useful for the long term $CO_2$ storage. Furthermore, as iron carbonate, $FeCO_3$, is a high-pressure high-temperature phase, it leaves only calcium and magnesium carbonates, $CaCO_3$ and $MgCO_3$, as practically relevant forms for $CO_2$ storage. Hence, the ultimate $CO_2$ sequestration potential of a material is calculated based on its calcium and magnesium content by the so-called Steinour formula:

$$CO_2\ total = 0.785\times(CaO - 0.56CaCO_3 - 0.7SO_3) + 1.091\times(MgO - 0.479MgCO_3)$$

where $CO_2$ total is the maximum theoretically achievable $CO_2$ sequestration related to the dry mass and CaO, $CaCO_3$, $SO_3$, MgO and $MgCO_3$ are weight fractions of the corresponding oxides and phases, see H. H. Steinour, "The Ultimate Products of the Carbonation of Portland Cement", Res. Dept Portland Cem. Assn Unpubl., 1956. This ultimate $CO_2$ sequestration potential is the basis for calculating the carbonation degree of a material after any carbonation step. Thus, herein the carbonation degree is defined as the mass of bound $CO_2$ relative to the total mass of $CO_2$ that can be bound and which is calculated with the Steinour formula.

The first carbonation step and particularly mixing the fresh concrete in the presence of $CO_2$, has two advantages: it accelerates the hydration reaction and it forms calcium carbonate. Acceleration of hydration enables faster gaining of green compressive strength and consumes water during the hydration/carbonation process. The formed calcium carbonate nanoparticles constitute nucleation seed for the calcium carbonate formed during the final carbonation step. Thus, the first carbonation step accelerates the next steps of the hardening process.

After the first carbonation step—depending on its duration also starting while carbonation still proceeds—the cement paste is allowed to gain strength by hydration. This hydration can take 60 to 300 minutes, often 30 to 240 minutes suffice and as a rule 10 to 120 minutes. Usually a strength of 0.5 MPa, preferably of 1 MPa, more preferred of 2 MPa, is reached and/or at least 5 wt.-%, more preferably at least 10 wt.-% and most preferred at least 15 wt.-% of the calcium aluminates are hydrated. Of course, hydration of the part continues as long as water and hydratable phases are present. During this hydration curing (second step) the fresh concrete will gain green strength and consume water. Green concrete parts result that can be demolded, if applicable. This process step is optimized to maximize the reaction of calcium aluminate, calcium ferrite, and calcium aluminate ferrite phases. Typically, curing takes place at a suitable relative humidity (RH) for hydration. An atmospheric gas flow enabling sample drying can be used if needed.

Subsequently, the green concrete parts are subjected to a final carbonation step. Here more $CO_2$ is provided to allow essentially complete carbonation of $Ca(OH)_2$ and at least some carbonation of the C—S—H phases and other hydrate phases formed by hydration. The presence of the nucleation sites of calcium carbonate formed during the first carbonation step accelerates carbonation during this step and provides a better distribution of the calcium carbonate in the carbonated matrix. It is noticeable that calcium carbonate nuclei will be fully compatible with the later on precipitating calcium carbonate, they are chemically and structurally similar since they have been formed under similar conditions.

As with the first carbonation step, unpurified $CO_2$ can be used since a $CO_2$ concentration from 5 to 99 Vol.-% is useful. Usually, carbon dioxide will be provided in the form of gas. Gases from modified clinker production lines, e.g. oxyfuel kiln lines or indirect calcination of the calcium or magnesium carbonate, or from carbon capture technologies applied or supposed to be applied in the cement industry, such as amine-based $CO_2$ scrubber, membrane-based gas separation, are preferably used to supply $CO_2$ in the method according to the invention. The carbon dioxide for the final carbonation can be the same as or different from the carbon dioxide for the first carbonation step. In one embodiment the gas recovered from one carbonation step is used for the other. Thereby the part of carbon dioxide captured by the method can be increased. The specific design depends on which step is critical. While the first step allows to dissolve carbon dioxide and facilitates contact of $CO_2$ and the carbonatable phases, the second is typically less time critical.

During the final carbonation step more than 80 wt.-%, preferably more than 90 wt.-% of the total consumed $CO_2$ will be added/reacted with the green concrete. This is achieved by subjecting the green concrete part to $CO_2$ in an amount resulting in a carbonation degree of more than 10%, preferably more than 15% and most preferably more than 20% of the total carbonation degree or until the compressive strength is 5 times, preferably 10 times, and most preferred 20 times higher than the green and early strength obtained in the previous steps.

Preferred conditions for the second carbonation step are:

a $CO_2$ concentration in the gas from 1 to 100 Vol.-%, preferably from 5 to 95 Vol.-%, most preferred from 10 to 50 Vol.-% a time of addition/interaction from 1 h to 100 h, preferably from 2 h to 50 h, most preferred from 3 h to 24 h a RH from 10 to 100%, preferably from 30 to 90%, most preferred from 50 to 70% a temperature in the range from 0 to 80° C., typically ambient temperature.

The carbonation chamber should be closed to provide/assure the conditions described above. For example a box can be used for batch processing. For continuous processing a system equipped with several locks is useful, analogous to what is used for the autoclave in sand-lime brick production, see e.g. https://www.masa-group.com/en/products/sand-lime-brick-production/.

The final step in the method is a hydration of any cement or concrete components that can hydrate and are not hydrated until the second and final carbonation is finished. To this end, the still wet or moist part is stored for some time, like from 0.5 h to 28 days. Typically, storing simply comprises the normal storage until use of the part including transportation time. However, a specific storing time, then typically with control of RH, can be foreseen, especially if the first hydration and second carbonation are concluded during very short times. Usually post-curing hydration is completed within 6 hours to 7 days, often within 1 day.

The method according to the invention provides novel concrete parts. They have more evenly distributed carbonate than parts made with carbonation only after hydration. They have more carbonate in the hardened cement matrix than parts made with adding carbon dioxide only to the fresh concrete. Specifically, the amount of carbonate can range from 5 to 100 wt.-% of the clinker content of dry cement, preferably from 20 to 80 wt.-%, most preferred from 40 to 60 wt.-%. The carbonate content is 2 times the $CO_2$ adsorbed, i.e. the carbonation degree. The percentages are related to the initial clinker content of the concrete/cement.

In one embodiment the concrete parts are formed in a mold. For this, the fresh concrete is preferably cast into a mold either after mixing or after the first carbonation step. Theoretically, the mixing can be done in the mold. Preferably the green concrete part is demolded to carry out final carbonation.

The method is especially suitable for manufacturing precast concrete parts, for example walls, panels, blocks, pavers, as well as drainage, water and sewage pipes.

As is known per se, the concrete part can also comprise reinforcement. Due to the lower pH of the hardened concrete resulting from carbonation aluminium reinforcement is more suitable than steel.

The concrete parts according to the invention are ideal when fibers are used as reinforcement which are made from material sensitive to high pH like glass and polymer. It is not necessary to use special glass or polymer since pH is lower than in prior art OPC parts.

The main advantages of the method according to the invention are:

Significant sequestration potential of $CO_2$, e.g. sequestration of $CO_2$ from a cement plant stack.

Utilization of $CO_2$ from the de-calcination of limestone during the production of the cement clinker. The $CO_2$ is bound as thermodynamically stable calcite, i.e. this is a safe solution avoiding re-emission of $CO_2$ during the service life of the concrete elements and after the service life.

No need for addition, de-agglomeration etc. of the special nucleus/additives for process acceleration. This facilitates the process.

Acceleration of the pre-cast concrete production and optimization of the precast elements performance, when comparing to the traditional production process and simple carbonation hardening.

Avoiding the need of purification of gases produced during the cement clinker production (oxyfuel kiln lines or indirect calcination of the calcium carbonate) or after the scrubbing of the $CO_2$ from the cement kiln (such as amine-based $CO_2$ scrubber, membrane-based gas separation or calcium-looping technologies).

The invention will be illustrated further with reference to the figures that follow, without restricting the scope to the specific embodiments described. The invention includes all combinations of described and especially of preferred features that do not exclude each other.

If not otherwise specified any amount in % or parts is by weight and in the case of doubt referring to the total weight of the composition/mixture concerned. A characterization as "approximately", "around" and similar expression in relation to a numerical value means that up to 10% higher and lower values are included, preferably up to 5% higher and lower values, and in any case at least up to 1% higher and lower values, the exact value being the most preferred value or limit.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

Figure 1:
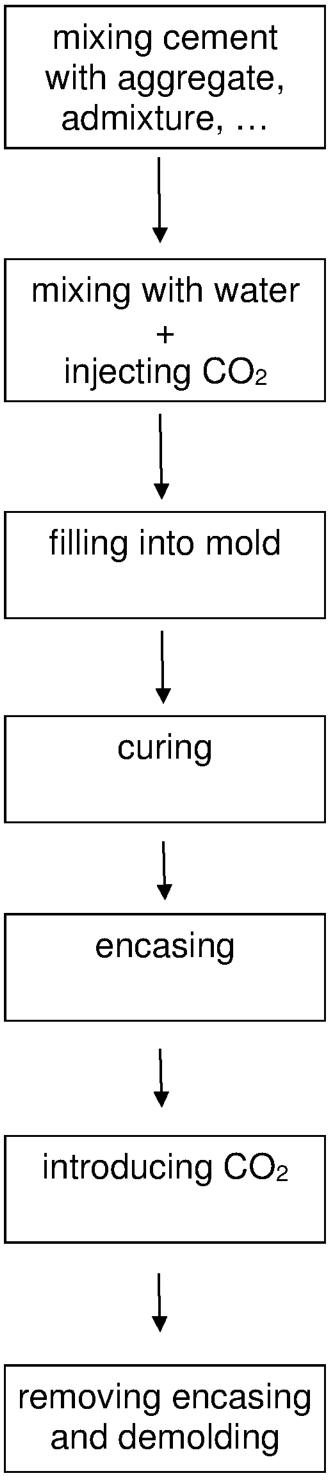
FIG. 1 shows a flow chart of a first preferred embodiment of the method according to the invention.

In the embodiment of FIG. 1 the cement and the further constituents like aggregate and admixtures are mixed with water while carbon dioxide is injected into the fresh concrete mixture. Exhaust gas from a cement kiln operating in the oxyfuel mode is used, which has a $CO_2$ concentration of about 75 Vol.-%. Approximately 500 to 750 l/minute are injected via a nozzle per $m^3$ of mixture. Thus, mixing and introducing $CO_2$ occur concurrently. Further, after about 5 minutes of mixing, the fresh concrete is poured into a mold made from formwork and left to cure via hydration for 20 minutes. During this time, some additional carbonation occurs with remaining $CO_2$. Then a containment is placed over the formwork and further exhaust gas introduced into the containment at a rate of about 1000 l/minute and $m^3$ of concrete part. Final carbonation is continued for 2 hours. Afterwards, the containment and formwork are removed. The concrete part continues to hydrate for 1 day and then shows a carbonate content of about 50 wt.-% of the original clinker in the cement.

Figure 2:
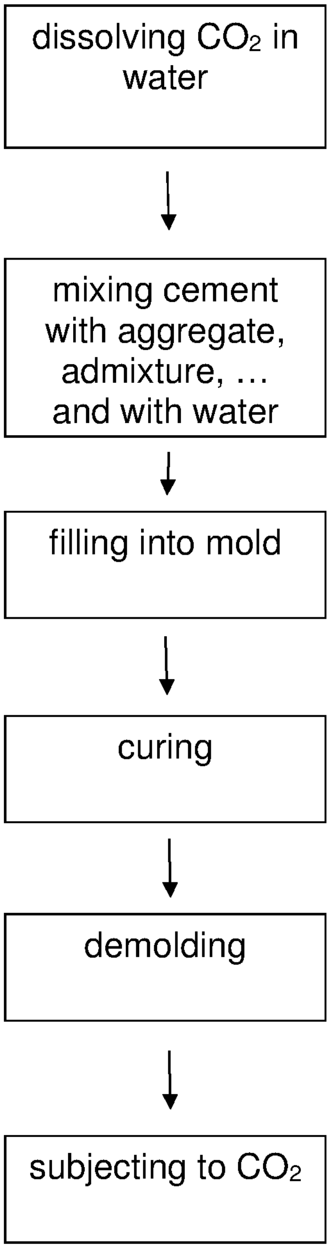
FIG. 2 shows a flow chart of another preferred embodiment.

FIG. 2 illustrates a method useful for manufacturing precast concrete parts, e.g. pavers. The plant is located adjacent a cement kiln and exhaust gas from the kiln is passed through water basins to dissolve it in water. The cement is mixed with sand and pigments and made into a fresh concrete by adding water from the water basins. After 10 minutes mixing, the fresh concrete is poured into the molds and left to hydrate for 30 to 60 minutes. Then, the green parts are removed from the molds, placed onto racks and subjected to the exhaust gas emerging from the water basins for 5 days. During this time, final carbonation and hydration occur simultaneously.

Figure 3:
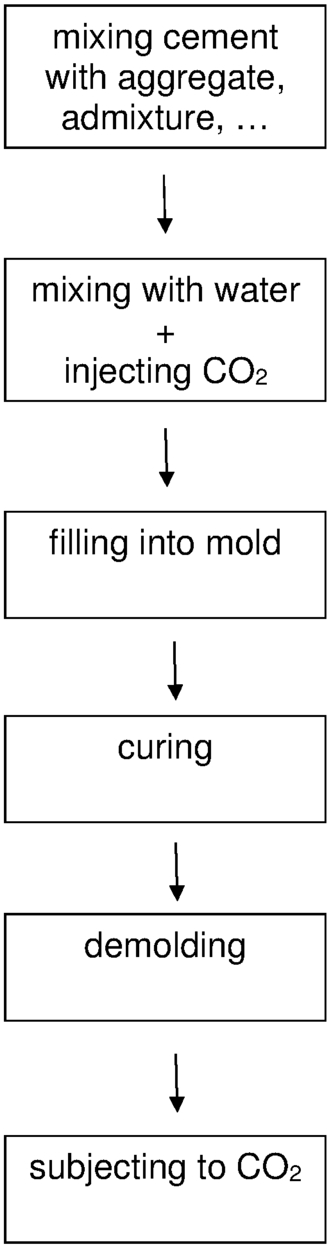
FIG. 3 shows a flow chart of yet another preferred embodiment.

The embodiment in FIG. 3 shows the manufacturing of big precast concrete parts like wall and floor elements. Here, the cement as well as aggregate and admixtures and possibly additives are mixed with introduction of gaseous carbon dioxide during mixing. Carbon dioxide from an amine based $CO_2$ scrubber is used to provide the carbon dioxide. For the first carbonation step, the gas recovered from the final step is utilized. This still has a $CO_2$ concentration of about 50 Vol.-%. The paste is filled into the molds and left to hydrate for 15 minutes. Then, the parts are demolded and subjected to the highly concentrated (about 90 Vol.-%) carbon dioxide for 1 day. Again, hydration occurs as post-curing simultaneously. As mentioned the gas left from the final carbonation step is used in the first carbonation step. Through using highly concentrated $CO_2$ in the method according to the invention the production rate can be increased significantly. This optimizes efficacy of the process.

The invention claimed is:

1. A method for manufacturing a concrete part comprising the following steps:

providing aggregate and a hydraulic cement containing calcium aluminates, mixing the cement and aggregate with water to provide a fresh concrete, introducing $CO_2$ into the fresh concrete in an amount of 10 to 20 wt.-% of total consumed $CO_2$ resulting in a carbonation degree of more than 0.5 wt.-% and less than 5 wt.-% of a total amount of carbonatable Ca and Mg phases which is calculated as $0.785\times(CaO-0.56\ CaCO_3-0.7\ SO_3)+1.091\times(MgO-0.479\ MgCO_3)$ for a first carbonation step, curing the fresh concrete until at least 15 wt.-% of the calcium aluminates are hydrated to provide a green concrete part, subjecting the green concrete part to $CO_2$ in an amount of 80 to 90 wt.-% of the total consumed $CO_2$ resulting in a carbonation degree of more than 10 wt.-% of the total carbonatable Ca and Mg phases which are calculated as $0.785\times(CaO-0.56\ CaCO_3-0.7\ SO_3)+1.091\times(MgO-0.479\ MgCO_3)$ for a final carbonation step, and storing the concrete part for 0.5 hours to 28 days for further hydration of not-yet carbonated, not-yet hydrated cement to provide the concrete part.

2. The method according to claim 1, wherein the $CO_2$ is provided in the fresh concrete by one or more of (i) mixing of cement, aggregate and water in the presence of $CO_2$, and/or by (ii) adding solid $CO_2$ during mixing, (iii) dissolving $CO_2$ in an aqueous component added to form the fresh concrete, (iv) pre-carbonating the cement before mixing, and/or (v) soaking a part or all of the aggregate with a $CO_2$ containing solution before mixing.

3. The method according to claim 1, wherein the hydraulic cement is selected from the group consisting of Portland cements, Portland composite cements, calcium aluminate cements, calcium sulfoaluminate cements and dicalcium silicate cements.

4. The method according to claim 1, wherein the water: cement weight ratio in the fresh concrete is set to range from 0.1 to 1.

5. The method according to claim 1, wherein the fresh concrete additionally contains one or more admixture(s) and/or one or more additive(s).

6. The method according to claim 1, wherein the $CO_2$ is introduced into the fresh concrete by dissolving the carbon dioxide in the water or a part of it, in an admixture solution and/or suspension, in an additive solution and/or suspension, or in more than one aqueous component.

7. The method according to claim 2, wherein the $CO_2$ is introduced into the fresh concrete by a combination of two or more of the variants (i) to (v).

8. The method according to claim 1, wherein the $CO_2$ introduced in the first carbonation step has a concentration from 5 to 99 Vol.-% and/or is provided in the form of gas, solution or solid material.

9. The method according to claim 1, wherein the amount of $CO_2$ introduced in the first carbonation step results in a carbonation degree of less than 4 wt.-%.

10. The method according to claim 1, wherein the fresh concrete is cured for 60 to 300 minutes and/or until a strength of 0.5 MPa is reached.

11. The method according to claim 1, wherein the $CO_2$ used for subjecting the green concrete part to $CO_2$ is provided in the form of gas with a concentration from 5 to 99 Vol.-%.

12. The method according to claim 1, wherein the introduced $CO_2$ and/or the $CO_2$ to which the green part is subjected is a gas from modified clinker production lines or from carbon capture technologies.

13. The method according to claim 1, wherein the fresh concrete is filled into a mold after mixing or after the first carbonation step and demolded after curing.

14. The method according to claim 3, wherein the hydraulic cement is selected from the group consisting of Portland cements, Portland composite cements and dicalcium silicate cements.

15. The method according to claim 4, wherein the water: cement weight ratio in the fresh concrete is set to range from 0.2 to 0.5.

16. The method according to claim 7, wherein the $CO_2$ is introduced by using a carbon dioxide solution depleted in $CO_2$ by soaking the aggregate according to variant (v) as mixing water according to variant (iii) or by using gaseous carbon dioxide with a $CO_2$ concentration decreased by having been bubbled through the fresh concrete during mixing in variant (i) for pre-carbonating the dry cement according to variant (iv).

17. The method according to claim 1, wherein the first carbonation step results in a carbonation degree of less than 3 wt.-% and more than 1 wt.-%.

18. The method according to claim 1, wherein the fresh concrete is cured for 30 to 240 minutes and/or until a strength of 1 MPa is reached.

19. The method according to claim 1, wherein the fresh concrete is cured for 10 to 120 minutes, and/or until a strength of 2 MPa is reached.

* * * * *